Figure 2A:
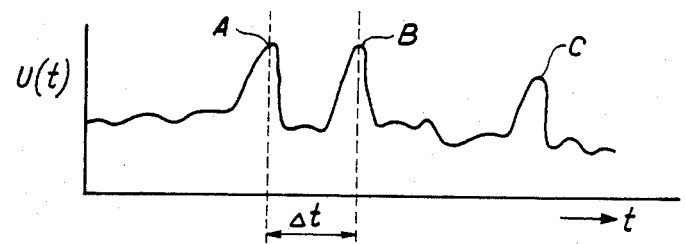

United States Patent [19]

Oomen

[11] Patent Number: 4,673,817

[45] Date of Patent: Jun. 16, 1987

[54] MEASURING SYSTEM FOR CONTACTLESS MEASURING THE DISTANCE BETWEEN A PREDETERMINED POINT OF AN OBJECT SURFACE AND A REFERENCE LEVEL

[75] Inventor: Gijsbert L. Oomen, Pijnacker, Netherlands

[73] Assignee: N.V. Optische Industrie De Oude Delft, Netherlands

[21] Appl. No.: 736,561

[22] Filed: May 21, 1985

[30] Foreign Application Priority Data

May 23, 1984 [NL] Netherlands .................. 8401649

[51] Int. Cl.$^4$ ............................................. G01B 11/30
[52] U.S. Cl. .................................. 250/561; 250/201; 356/1; 356/4; 356/376
[58] Field of Search ............... 356/1, 4, 376, 381; 354/403; 250/561, 201 AF

[56] References Cited

U.S. PATENT DOCUMENTS

| | | | |
|---|---|---|---|
| 4,227,813 | 10/1980 | Pirlet | 356/1 |
| 4,502,785 | 3/1985 | Truax | 356/1 |
| 4,582,424 | 4/1986 | Kawabata | 356/1 |

FOREIGN PATENT DOCUMENTS

| | | | |
|---|---|---|---|
| 0154402 | 12/1980 | Japan | 356/376 |
| 0104808 | 6/1982 | Japan | 356/376 |
| 0028606 | 2/1983 | Japan | 356/376 |
| 1084600 | 4/1984 | U.S.S.R. | 356/376 |

*Primary Examiner*—Edward P. Westin
*Assistant Examiner*—Charles Wieland
*Attorney, Agent, or Firm*—Brumbaugh, Graves, Donohue & Raymond

[57] ABSTRACT

A system for measuring without contact the distance between a predetermined point of an object surface and a reference level using trigonometric principles includes a transmitting section with a source of radiation for emitting a plurality essentially parallel radiation beams of small separation to the point of the object surface to be investigated and a receiving section with a detector responsive to the reflected radiation. The detector converts the reflected radiation into a corresponding electrical signal and includes a radiation sensitive area which is restricted to a substantially linear area. The output of the detector is coupled to signal processing means in which a discriminating operation is carried out between detector signals which have, or have not, a predetermined separation or separations corresponding to the separation or separations between said radiation beams.

7 Claims, 7 Drawing Figures

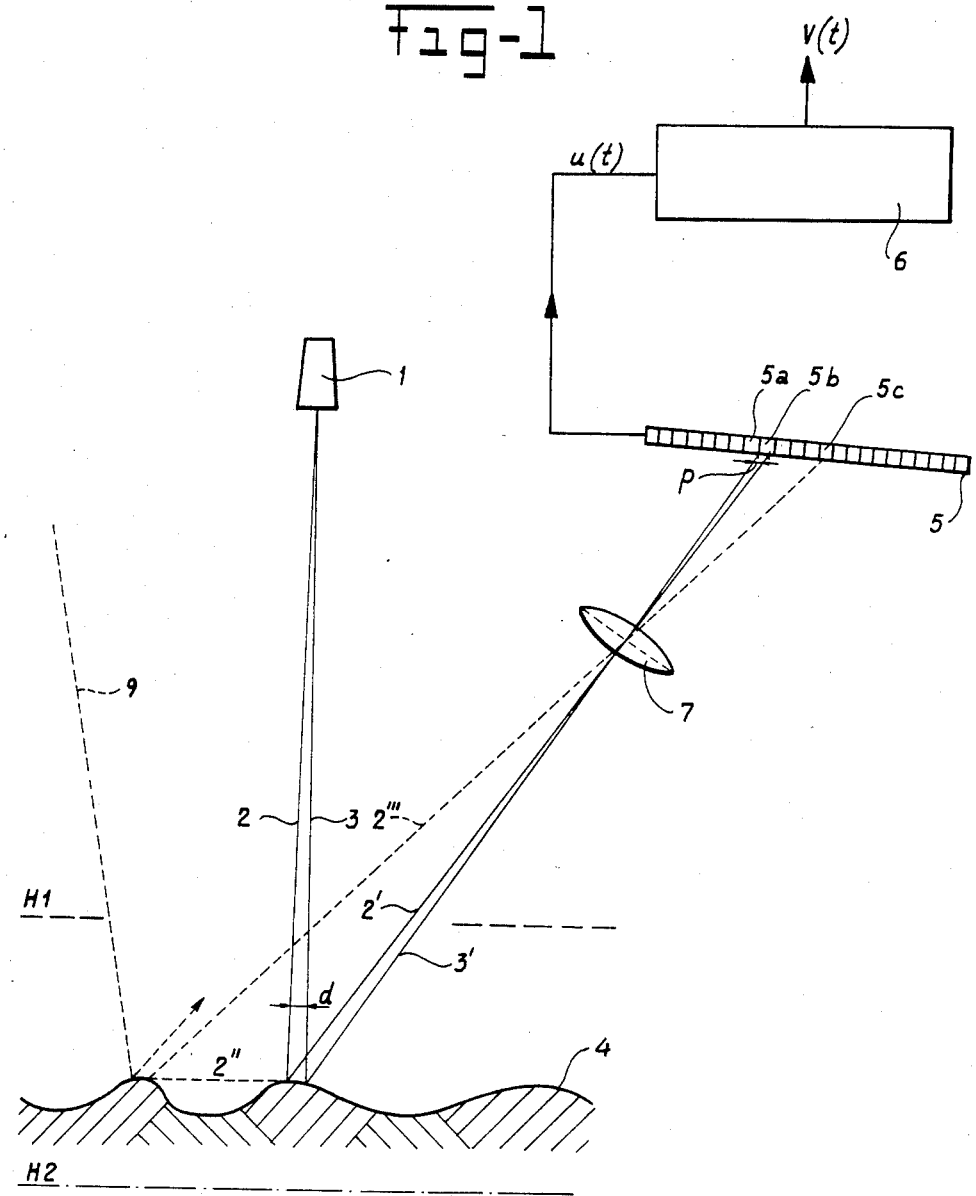

MEASURING SYSTEM FOR CONTACTLESS MEASURING THE DISTANCE BETWEEN A PREDETERMINED POINT OF AN OBJECT SURFACE AND A REFERENCE LEVEL

The invention relates to a system for measuring without contact the distance between a predetermined point of an object surface and a reference level using a trigonometrical principle, comprising: a transmitting section with a source of radiation for transmitting measuring radiation to the object surface to be investigated and a receiving section with a detector, responsive to the reflected radiation, which detector converts the reflected radiation received through at least a focussing lens into a corresponding electrical signal, of which detector the radiation sensitive area is restricted to a substantially linear area, whereby the focussing lens as well as eventual further means present in the reception path are configurated such that only object surface elements irradiated within a restricted observation area are imaged as focussed spots onto said linear radiation sensitive area of the detector.

A measuring system of this type is described in the Dutch patent application No. 83.02228, which is also assigned to applicant. This prior art measuring system comprises a detector in the form of a linear array of light sensitive cells. This array receives mainly light from a restricted observation area determined by the image of the linear detector in the object space. The result thereof is that the disturbing influence of radiation from the environment onto the measurement results can be decreased significantly such that the signal to noise ratio of the detector output signal is enhanced correspondingly.

Although the focussing lens as well as eventual further means present in the reception path take care that only radiation from a restricted area of observation is able to reach the detector, not all possible disturbing signals are eliminated thereby. Although reflections, caused by elements of the object surface outside the restricted observation area cannot reach the detector and therefore cannot cause a disturbance of the measuring signal, it is possible that disturbing signals are generated within the area of observation. On the one hand said disturbing signals can be caused by light from the environment reflecting within the linear area of observation and on the other hand it can be caused by double reflection. In the latter case a part of the light of the radiation beam transmitted by the source of radiation is, after reflection against the object surface at the actual measuring point again reflected against an other point of the object surface. If said other point is positioned within the observation area of the detector then the second reflection causes the generation of a disturbing signal.

An object of the invention is now to eliminate also these disturbing signals or at least reduce the influence thereof significantly.

In agreement with said object the measuring system of the above indicated type is according to the invention characterized in that the source of radiation emits a number of parallel or approximately parallel radiation beams with small separation therebetween and that the detector is coupled to signal processing means in which a discriminating operation is carried out between detector signals which have, or have not, a predetermined separation corresponding to the separation between said radiation beams. Each of the radiation beams will be reflected by the object surface such that a number of reflected radiation beams, corresponding to the number of transmitted radiation beams, will reach the receiving part of the detector. Because of the defined separation between the beams, the focussed spots on the linear radiation sensitive area of the detector will have a predetermined separation. Said separation is now used as a detection criterion in the signal processing means. The disturbing radiation which, caused by directly impinging or reflected environmental light or caused by double reflection, reaches the linear radiation sensitive detector, will not show said separation and therefore a discrimination between the desired signals and the disturbing signals is possible.

It is to be noted that, because a linear detector is used, the radiation beams have to be positioned within a common plane to assure that the reflection beams can be detected by the detector.

Although more than two mutually parallel or nearly parallel radiation beams can be emitted by the source of radiation, in which case a very accurate discrimination can be realized in relation to disturbing radiation, the generation of said number of radiation beams by the source of radiation will on the one hand be very cumbersome and on the other hand the processing of the measured signals will become more and more difficult as the number of beams increases. Therefore it is preferred that the number of radiation beams is equal to two.

Although theoretically a number of separate sources of radiation can be applied each emitting one radiation beam, in practice such a solution will hardly be conceivable with acceptable means because of the very small separation desired between the beams. In a practical solution therefore one single source of radiation (for instance a laser light source) is used and the radiation beam generated thereby is passed through an optical system to divide it into two (or more) separate parallel or nearly parallel radiation beams. In a further embodiment of the invention the radiation beams are emitted alternately in time, whereby the signal processing means comprise means for combining the successive detector output signals into only one signal which can be subjected to the discrimination operation and recognized by the respective circuits in the processing means.

Beside said time modulation of the emitted radiation beam a variation in the polarisation is also possible to increase the intensity of the detection signals and therewith the likeliness that the discrimination in relation to the disturbing signals is carried out correctly. In such an embodiment both radiation beams are polarized differently and means are inserted in the reception path, which means in an alternating manner transfer only light with a predetermined polarisation.

In the measuring system which is described in the Dutch patent application No. 83,02228 the linear radiation sensitive area of the detector makes a certain angle with the main surface of the focussing lens. The result thereof is that independent of the distance between the object surface and the reflection surface the imaged spot on the linear radiation sensitive area of the detector will be focussed. That applies, however, in principle only for one single radiation beam from the source of radiation. If in accordance with the invention two or more radiation beams are transmitted reaching the object surface within the observation area at a desired separation, then only one of the reflected beams will have the optimum focussing. Because the distance between said beams is selected very small, the influence of the not completely correct focussing of the other beam(s) is of minor importance. The image onto the detector remains within the depth of the field. However, variation is possible in the separation between the detector signals as a function of the height of the object surface in the measuring area. It turns out that an optimum dimensioning of the complete configuration can be obtained in case the radiation beams enclose a very small angle, the value of which is, dependent on the geometry of the complete system, selected such that independent of the height of the object surface in the measuring area the distance between the detection signal peaks has a constant or nearly constant value.

The invention will now be explained in more detail with reference to the attached drawings.

FIG. 1 illustrates schematically a system according to the invention.

Figure 2B:
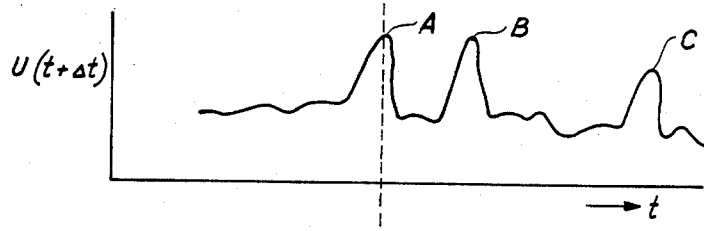
Figure 2C:
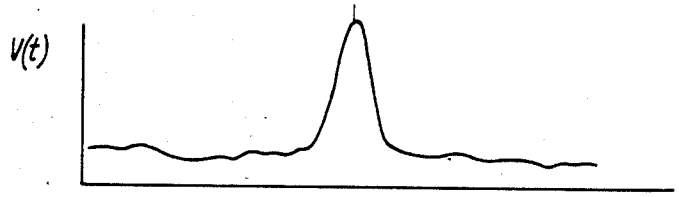

FIG. 2a-c illustrates output signals of the detector and the signal processing means of FIG. 1 in case the source radiates two beams simultaneously.

Figure 3A:
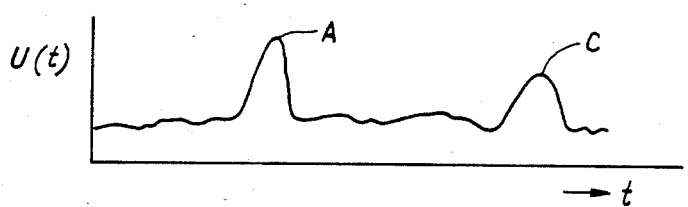
Figure 3B:
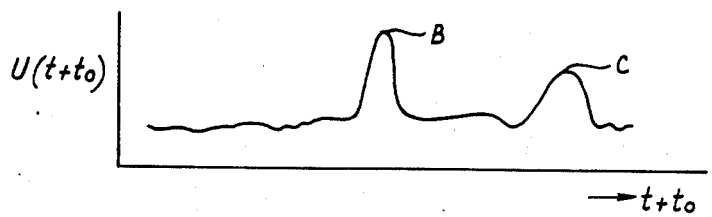
Figure 3C:
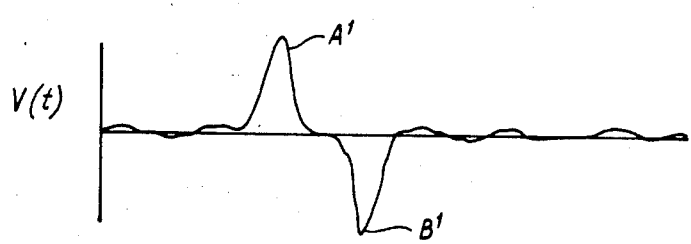

FIG. 3a-c illustrates output signals of the detector and the signal processing means in FIG. 1 in case the source radiates two beams alternately.

In FIG. 1 the source of radiation is indicated by 1. Said source of radiation transmits two light beams 2 and 3 in the direction of the surface 4 to be scanned. The two light beams will result into a reflected light beams 2' 3' respectively which through a focussing lens 7 and further means (not shown) will reach the detector array 5. Said array comprises for instance a linear series of light sensitive cells, some of which are individually indicated by 5a, 5b, and 5c. In the Figure the light beam 2' impinges onto cell 5b and the light beam 3' impinges onto cell 5a.

The angle between beams 2 and 3 is selected to be very small and therewith the distance d between the light signals 2 and 3 will, viewed over the complete measuring area between the levels H1 and H2 show hardly any variation and in practice can be considered as a constant value. Both beams 2 and 3 will, irrespective of the actual level of the object surface 4, always result in two reflections onto the detector 5 of which the separation distance p hardly varies and in any case is predictable. In FIG. 5 both reflected beams 2' and 3' will be received by neighbouring cells but it will be clear that, dependent onto the resolution of the detector array, said distance also can be larger.

As is already remarked the angle between the beams 2 and 3 can be selected, dependent onto the geometry of the system, such that the separation p between the image spots onto the detector array is constant or nearly constant.

The array 5 is sequentially scanned in known fashion by means of the signal processing unit 6 resulting in a serial scan signal in which the signals resulting from the cells 5a and 5b will appear as relatively high peaks. By means of generally known autocorrelation methods said peaks, which have a fixed or at least predictable separation, can be separated from eventual other disturbing signals from other cells.

A possible problem in this system is caused by multiple reflections or by reflecting light from the environment which, not withstanding all the restricting measures, is able to reach the detector. Examples are indicated in the Figure.

Part of the light beam 2 is reflected against the surface 4 resulting into the desired reflection beam 2' and the undesired light beam 2" which after further reflection against the surface 4 at the left hand of the actual measuring spot results in the light beam 2''' which through the lens 7 is also projected onto the detector array 5 specifically on the cell 5c. Scanning of the detector array 5 will result into a signal U(t) varying with the time t and of which the amplitude U shows a number of peaks as is indicated in FIG. 2a. The peaks A, B and C are respectively caused by the signal outputs of the cells 5a, 5b and 5c of the detector array 5. Also other cells are able to receive disturbing reflections such that the level of the detector signal between the peaks A, B and C will in most cases not be equal to zero. Because in the output signal two peaks with a predetermined intermediate distance are expected the signal indicated in FIG. 2a can be processed by means of a known autocorrelation method in the signal processing unit 6. In agreement therewith the signal U(t) (FIG. 2a) is delayed over a period $\Delta t$ corresponding to the expected distance between the signal peaks A and B. The delayed signal $U(t + \Delta t)$ (FIG. 2b) is thereafter in an autocorrelator combined with the signal U(t) resulting in the signal U(t) exhibiting a sharp peak at the same position as peak B in the non-delayed detector signal. After the autocorrelation process the disturbance peak C is eliminated. The detection of the height of the point of the object surface 4, which was irradiated by both light beams 2 and 3 is therewith completed.

As is indicated in FIG. 1 with the reference number 9 it is also possible that reflections are caused by light from the environment, such that these reflections are also within the observation area of the detector 5. Also these reflections, however, can be discriminated against the expected signal peaks with predetermined separation distance.

FIG. 3 illustrates a number of signal shapes for the case that both signal beams are not simultaneously impingeing onto the detector array, for instance because of time modulation or the use of different polarisations, the beams 2' and 3' are received alternately. If the switching between both beams is carried out with a period t0 then the detector array will provide initially the signal U(t) which is indicated in FIG. 3a and will thereafter provide the signal U(t+t0), indicated in FIG. 3b. Both signals contain not only the peak A or B, but also a disturbing peak C.

If the switching period is selected very short, then for the further signal processing it can be assumed that with the exeption of the peaks A and B the signals U(t) and U(t+t0) are substantially or entirely equal to each other. If the signal U(t) is passed through a delay line and the output signal thereof supplied to a subtractor circuit within the unit 6 also supplied with the signal U(t+t0) then the output signal V(t) thereof has the form as indicated in FIG. 3c, in which output signal the peak C is eliminated and in which the height of the object surface is clearly defined by the peaks A' and B'.

These signal processing examples are only mentioned as an illustration of the various possibilities to process the detector signals and the invention is certainly not restricted to these examples.

The practical application of the autocorrelation method or an other suitable signal processing method and the practical embodiment of a suitable signal processing unit is considered as within reach of the average expert in this field. Also the optical means necessary for generating separate radiation beams, the modulation in time of the beams and/or the polarisation thereof (e.g. by means of controlled liquid crystal elements) is considered as within reach of the average expert in this field.

I claim:

1. A system for measuring without contact the distance between a region of an object surface and a reference level using trigonometric principles comprising:

transmitting means including a source of radiation for transmitting measuring beams of radiation to the limited observation region of the object surface for reflection therefrom in a desired direction;

receiving means in fixed relation to said reference level including detection means for receiving the radiation reflected in said desired direction and focusing means for focusing radiation reflected from said region of the object surface in the desired direction, said detection means having a limited position-sensitive linear region where it is radiation sensitive and the focusing means being adapted to focus, as spots on the radiation sensitive region, radiation reflected only from the limited observation region of the object surface, characterized in that the source of radiation emits at least two beams along paths that are essentially parallel and separated by a prescribed distance when incident on the object surface, the prescribed distance being such that the two beams, after reflection from the limited observation region and traversal of the focusing means, are separate spots on the linear radiation sensitive region of the detection means and there is further included signal processing means, to which is supplied an output of the detecting means and which can select for further processing output signals which correspond to the spots, which are spaced apart along the radiation sensitive region a distance which is related in known fashion to the distance separating the beams.

2. The system of claim 1 in which the number of beams of measuring radiation and the number of spots is two.

3. The system of claim 2 in which the two beams are provided alternately in time and the signal processing means combines the resulting pair of successive detector signals.

4. A measuring system in accordance with claim 2 in which the two beams are polarized differently, and means are included along said paths which transmit alternately only light with a predetermined polarization.

5. A measuring system in accordance with claim 3 in which the two beams are polarized differently, and means are included in the paths which transmit alternately only light with a predetermined polarization.

6. A measuring system according to claim 2 in which the source of radiation is a laser and the two beams are emitted with a sufficiently small angle between them that the separation of their spots on the radiation sensitive region remains relatively uniform despite height variations in the object surface.

7. The system of claim 1 in which the detection means comprises a linear series of light sensitive cells, the signal processing means being adapted to select for further processing the signals from two cells spaced apart a prescribed number of cells of the series.

* * * * *